United States Patent [19]

Runels

[11] Patent Number: 4,938,644

[45] Date of Patent: Jul. 3, 1990

[54] BOLT AND NUT LOCK ASSEMBLY

[75] Inventor: Thomas L. Runels, Battle Creek, Mich.

[73] Assignee: Eaton Corporation, Cleveland, Ohio

[21] Appl. No.: 355,257

[22] Filed: May 22, 1989

[51] Int. Cl.[5] ...................... F16B 39/24; F16B 39/282

[52] U.S. Cl. .................................. 411/132; 411/120; 411/143; 411/146; 411/964

[58] Field of Search ............... 411/109, 924, 217, 149, 411/146, 326, 145, 144, 327, 329, 330, 331, 221, 220, 222, 533, 544, 123, 96, 100, 108, 132, 136, 137, 138, 150, 114, 119, 120, 129, 130, 131, 143, 148, 332, 347, 532, 964

[56] References Cited

U.S. PATENT DOCUMENTS

| | | | |
|---|---|---|---|
| 424,836 | 4/1890 | Thompson . | |
| 531,024 | 12/1894 | Dolan | 411/132 X |
| 900,589 | 10/1908 | Ratcliffe . | |
| 1,532,603 | 4/1925 | Russell et al. | 411/924 X |
| 1,763,505 | 6/1930 | Duffy . | |
| 2,151,919 | 3/1939 | Jacobsen . | |
| 2,370,223 | 2/1945 | Beuer . | |
| 4,534,101 | 8/1985 | Rosaán, Jr. | 411/109 X |

FOREIGN PATENT DOCUMENTS

| | | | |
|---|---|---|---|
| 125336 | 6/1949 | Sweden | 411/129 |

*Primary Examiner*—Rodney M. Lindsey
*Attorney, Agent, or Firm*—A. E. Chrow

[57] ABSTRACT

A bolt lock assembly (40) and a nut lock assembly (60) are provided that respectively include a collar member (16) that is moveable in opposite axial directions in a counterbore (12) in an object (4) and is biased outwardly therefrom by a coiled spring (20). Counterbore (12) has at least one slot (14) extending radially outwardly therefrom and collar member (16) has at least one locking member (18) extending therefrom having a portion registerable with and remaining in slot (18) and a portion adapted to engage locking surfaces on a bolt head (6) of bolt (2) or a nut (24) when collar member (16) is urged outwardly from counterbore (12) to provide the locked engagement therebetween.

8 Claims, 1 Drawing Sheet

40 2 32 6 14 18 20 16 10 12 7 8 9 14' 18' 4

BOLT AND NUT LOCK ASSEMBLY

INTRODUCTION

This invention relates generally to an assembly operative to releasably lock either a bolt to an object or a nut to a threaded shank extending from an object to prevent unintended loosening.

BACKGROUND OF THE INVENTION

A variety of devices have been developed over the years to prevent bolts from loosening from whatever they are threaded into and to prevent nuts from loosening from bolts onto which they are threadingly secured.

One example of a bolt lock device is disclosed in U.S. Pat. No. 2,370,223, the disclosure of which is incorporated herein by reference. The device however, is highly complex and requires two counteracting coiled springs in order to provide its locking function.

Examples of nut locking devices such as lock washers having one or more tongues or gripping elements that engage a side of the nut to prevent it from rotating are respectively disclosed in U.S. Pat. Nos. 424,836 and 2,151,919, the disclosures of which are incorporated herein by reference. In the nut lock of the 424,836 patent, the locking tongues would have to be bent outwardly after the nut is secured to the bolt and then forcibly flattened before the nut could be loosened. The locking device in the 2,151,919 patent relies upon friction and may not prevent the nut from loosening under certain circumstances.

Examples of nut locks employing coiled springs are respectively disclosed in U.S. Pat. Nos. 900,589 and 1,763,505, the disclosures of which are incorporated herein by reference. Both however, are highly complex and would not readily lend themselves both as a bolt lock and as a nut lock.

SUMMARY OF THE INVENTION

Accordingly, it is an object of this invention to provide a selectively releasable bolt and nut lock assembly that is highly effective in locking a bolt to an object and for locking a nut to a bolt shank and to an object from which the bolt shank extends.

It is another object of this invention to provide a bolt and nut locking assembly that is easy to operate and is relatively simple in design.

DESCRIPTION OF SOME PREFERRED EMBODIMENTS

Figure 1:
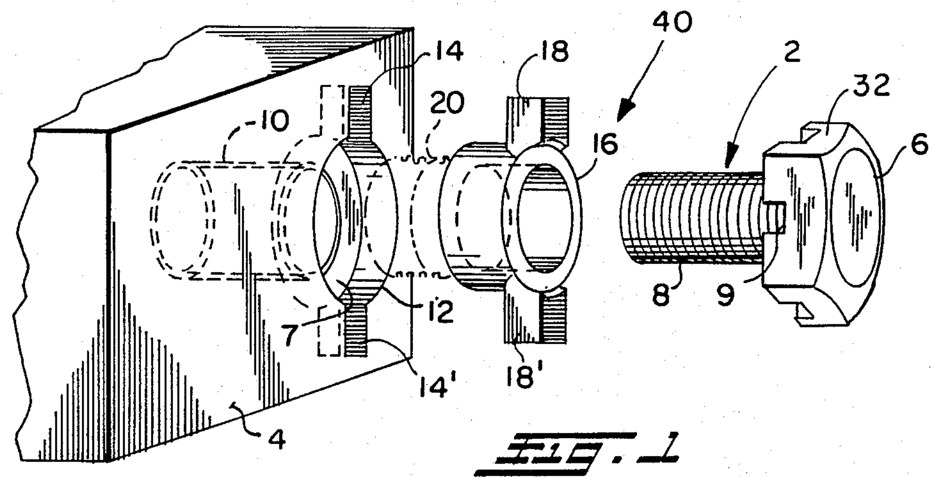
FIG. 1 is an exploded perspective view of a bolt lock assembly 40 of the invention.

Assembly 40 shown in FIG. 1 is a bolt lock assembly operative to releasably lock bolt 2 to an object 4 which may, of course, be a singular object to which bolt 2 is to be releasably locked or may be two or more objects such as plates that are to be secured together by bolt 2.

Bolt 2 has an enlarged head 6 from which extends a substantially tubular or stud shank 8 that is at least partially threaded.

Object 4 has a bore 10 therein that may or may not be threaded such as where shank or stud 8 is to pass through object 4 into a threaded bore of an adjacent object to be secured to object 4 or, in instances where a threaded nut is used, to secure bolt 2 on the opposite side which may itself be releasably locked to the opposite side of object 4 or to any intermediate objects therebetween secured together by bolt 2 by utilizing the nut lock assembly of the invention hereinafter described with respect to assembly 60 of FIG. 2.

A counterbore 12 of predetermined axial length is disposed in object 4 in substantial axial alignment with bore 10. Counter bore 12 has a larger diameter than the diameter of bore 10 defining a substantially annular shoulder 7 at the intersection therebetween that faces away from bore 10 towards counterbore 12 as shown in FIG. 1.

Object 4 is characterized by including at least one slot 14 that extends outwardly from the periphery of counterbore 12. Object 4 preferably includes a plurality of slots such as slots 14 and 14' that extend outwardly from substantially diametrically opposite sides of the periphery of counterbore 12. Slots 14 and 14' extend for a distance sufficient to ensure that a portion remains exposed outwardly of bolt head 6 when bolt head 6 is aligned with counterbore 12 and brought into close proximity thereto or, more simply stated, that they extend for a predetermined radial distance beyond the breadth of bolt head 6.

Assembly 40 has a collar number 16 having an opening (not referenced) for receiving shank 8 of bolt 2 therethrough. Collar member 16 is adapted to be received into and be able to move in opposite axial directions within counterbore 12.

Collar member 16 is provided with at least one locking member extending outwardly therefrom, preferably in the form of tab 18, that is adapted to register with and be received into slot 14 or additional slots such as slot 14' when such are included. Collar member 16 preferably has two locking members, preferably in the form of tabs 18 and 18' extending outwardly therefrom that, as in the case of slots 14 and 14' extend radially outwardly from collar member 16 for a distance sufficient to insure that a predetermined portion thereof remains exposed outwardly of bolt head 6 when bolt head 6 is axially aligned with counterbore 12 and brought into close proximity thereto.

A portion of locking members 18 and 18' is adapted to lockingly engage locking means provided on bolt head 6, as hereinafter described, to provide locked engagement between bolt 2 and object 4.

Resilient biasing means, such as coiled compression spring 20, is disposed within counterbore 12 with one end resting on shoulder 7 and the opposite end engaging the end of collar member 16 facing theretowards. Spring 20 has an aperture (not referenced) for receiving shank 8 therethrough from the opening through collar member 16 to enable it to be received into bore 10.

Spring 20 and collar member 16 are respectively adapted such that spring 20 is able to urge collar member 16 axially away from shoulder 7 for a distance exposing a predetermined portion of locking members 18 and 18' outwardly of slots 14 and 14'.

Locking members 18 and 18'; slots 14 and 14'; counterbore 12; and collar member 16 are adapted such that locking members 18 and 18' can be respectively pressed inwardly into slots 14 and 14' sufficiently to ensure that bolt head 6 can be brought into predetermined proximity to object 4 without entering into locked engagement with locking members 18 and 18'.

The preferred locking means provided bolt head 6 is in the form of at least one channel 9 disposed in a side of bolt head 6 facing towards shank 8. Preferably, bolt head 6 is provided with a plurality of channels 9 that are disposed substantially circumferentially equi-distant from each other and that are adapted to respectively register with and receive a portion of locking members 18 and 18' thereinto to provide the releasably locked engagement between bolt 2 and object 4.

In operation, spring 20 is inserted into counterbore 12 followed by collar member 16 oriented so that locking member 18 is received into slot 14 and locking member 18' is received into slot 14'. Shank 8 of bolt 2 is inserted through the opening through collar member 16 and the aperture through spring 20 and into bore 10. In the case where bore 10 has threads operable to threadingly engage the threads on shank 8, bolt 2 is rotationally threaded into bore 10 by a wrench or the like. Pressing the exposed portions of tabs 18 and/or 18' inwardly into slots 14 and 14' by hand or by the wrench enables bolt head 6 to advance into predetermined close proximity to slots 14 and 14' in object 4, which may be virtually a flush surface to surface contact at which time tabs 18 and 18' are released and bolt head 6 rotated to bring diametrically opposite channels 9 into registration therewith, at which point, spring 20 operates to urge a portion of tabs 18 and 18' into the channels 9 whilst ensuring that a portion thereof respectively remain in slots 14 and 14' to provide the releasable locked engagement between bolt 2 and object 4.

The locked engagement between bolt 2 and object 4 is easily released since portions of tabs 18 and 18' remain exposed outside the breadth of bolt head 6 which can be pressed inwardly sufficiently to release tabs 18 and 18' respectively from channels9 to enable bolt 2 to be rotatingly removed from bore 10.

Figure 2:
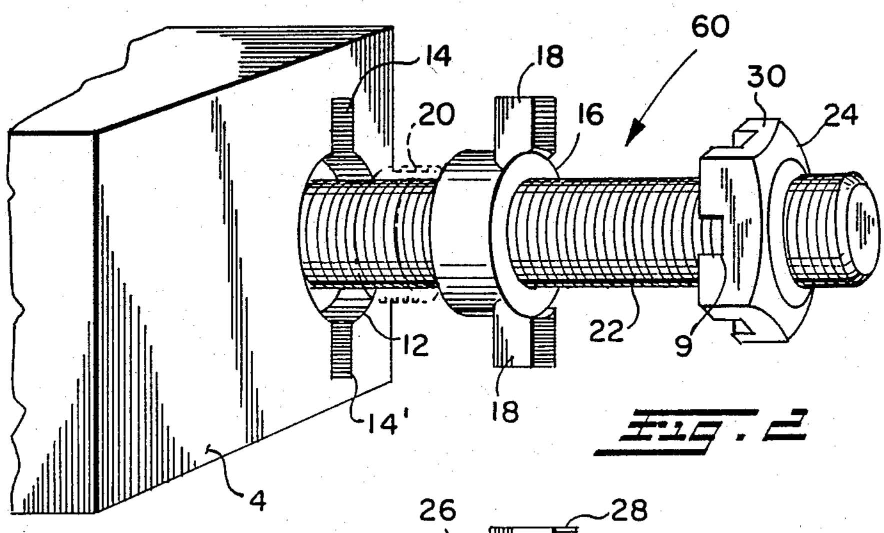
FIG. 2 is an exploded perspective view of a nut lock assembly 60 of the invention.

Assembly 60 of FIG. 2 operates on essentially the same principle hereinbefore described for assembly 40 except that assembly 60 is a nut lock assembly being used to releasably lock a nut 24 to object 4 that is threadingly engaged to an externally threaded shank extending outwardly from counterbore 12.

As previously described with respect to object 4 for assembly 40, bore 10 in object 4 (not shown in FIG. 2) may be threaded such that shank 8 is threaded through bore 10 from an opposite side of object 4 or through one or more objects being joined together by shank 8 and nut 24.

The operation of locking and releasing nut 24 from object 4 is essentially the same as hereinbefore described for assembly 40 of FIG. 1 and is therefor not repeated here.

Figure 3:
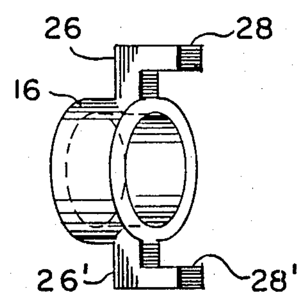
FIG. 3 is a perspective view of another embodiment of a collar member 16 used in assembly 40 of FIG. 1 and in assembly 60 in FIG. 2.

In FIG. 3, collar member 16 is provided with another embodiment of locking members than tabs 18 and 18' hereinbefore described by having at least one and preferably two diametrically opposed locking members extending outwardly away from collar member 16 having respective portions 26 and 26' adapted to register with and be respectively received into slots 14 and 14' and which respectively further includes fingers 28 and 28' extending respectively therefrom that are adapted to move outwardly away from counterbore 12 and engage a flat section, such as section 30 on nut 24 or section 32 on bolt head 6, whilst portions 26 and 26' remain in slots 14 and 14' respectively to provide the locking engagement between object 4 and bolt 2 or nut 24 as the case may be.

What is claimed is:

1. A bolt lock assembly for releasably locking a bolt to an object, said bolt having an enlarged head having an at least partially externally threaded shank extending therefrom, said object having a bore therein and a counterbore having a larger diameter substantially axially aligned therewith defining a shoulder at the intersection therebetween facing away from the bore theretowards, said object characterized by having at least one slot extending radially outwardly from the periphery of the counterbore for a distance sufficient to insure that a predetermined portion of thereof remains exposed when the bolt head is in substantial axial alignment with the counterbore and brought into close proximity thereto, and said assembly comprising;

a collar member adapted to be received into the counterbore separately from the bolt and operable to move in opposite axial directions relative thereto, said collar member having an opening adaPted to receive the bolt shank therethrough, at least one locking member extending outwardly from the collar member and adapted to be received into the slot when in registration therewith and the collar member is received into the counterbore with a portion thereof radially exposed when the bolt head is in axial alignment with the collar member and brought into close proximity thereto, resilient biasing means disposed in the counterbore between the shoulder and the collar member and having an aperture adapted to receive the bolt shank therethrough, said biasing means operative to urge a predetermined portion of the locking member outwardly from the slot, and means associated with the bolt head for releasably locking the bolt to the object when the locking member comes into engagement therewith, said assembly operable such that, when the bolt shank is inserted through the collar member opening and the resilient biasing means aperture and into the bore, pressing the exposed portion of locking member axially inwardly against the resilient biasing means enables the bolt head to be brought into predetermined proximity to the object and release of the locking member when the bolt head locking means is in substantial registration therewith enables the resilient biasing means to urge a portion of the locking member axially outwardly into the bolt head locking means whilst a portion thereof remains in the slot to provide the locked engagement between the bolt and the object.

2. A nut lock assembly for releasably locking a threaded nut to an object, said object having a bore therein and a counterbore having a larger diameter substantially axially aligned therewith defining a shoulder at the intersection therebetween facing away from the bore theretowards, said object having a shank extending from the bore outwardly through the counterbore having threads adapted to threadingly engage the nut threads, and said object characterized by having at least one slot extending radially outwardly from the periphery of the counterbore for a distance sufficient to insure that a predetermined portion thereof remains exposed when the nut is in substantial axial alignment with the counterbore and brought into close proximity thereto, and said assembly comprising;

a collar member adapted to be received into the counterbore separately from the nut and operable to move in opposite axial directions relative thereto, said collar member having an opening adapted to receive the shank therethrough, at least one locking member extending outwardly from the collar member and adapted to be received into the slot when in registration therewith and the collar member is received into the counterbore with a portion thereof exposed when the nut is in substantial axial alignment with the collar member and brought into close proximity thereto, resilient biasing means disposed in the counterbore between the shoulder and the collar member and having an aperture adapted to receive the shank therethrough, said biasing means operative to urge a predetermined portion of the locking member outwardly from the slot, and means associated with the nut for releasably locking the nut to the object when the locking member comes into locking engagement therewith, said assembly operable such that, when the nut is threadingly engaged with the shank, pressing the exposed portion of the locking member inwardly against the resilient biasing means enables the nut to be brought into predetermined proximity to the object and release of the locking member when the nut locking means is in substantial registration therewith enables the resilient biasing means to urge a portion of the locking member outwardly into engagement with the nut locking means whilst a portion thereof remains in the slot to provide the locked engagement between the nut and the object.

3. The assembly of claim 1 or 2 wherein the object has two of the slots extending outwardly from substantially diametrically opposite sides of the counterbore periphery and the collar member has two of the locking members respectively registerable therewith.

4. The assembly of claim 1 wherein the bolt head locking means is a channel in a side thereof facing towards the shank and the locking member is a tab having a portion adapted to be received into the channel to provide the locked engagement therebetween.

5. The assembly of claim 2 wherein the nut locking means is a channel in a side thereof facing towards the shank and the locking member is a tab having a portion thereof adapted to be received into the channel to provide the locked engagement therebetween.

6. The assembly of claim 1 wherein the bolt head has at least one flat section on a side thereof and the locking member includes a finger extending therefrom that is operative to engage the flat section to provide the locked engagement therebetween.

7. The assembly of claim 2 wherein the nut has at least one flat section on a side thereof and the locking member includes a finger extending therefrom that is operative to engage the flat section to provide the locked engagement therebetween.

8. The assembly of claim 1 or 2 wherein the resilient biasing means is a coiled compression spring.

* * * * *